United States Patent [19]

Braatz

[11] Patent Number: 4,973,136

[45] Date of Patent: * Nov. 27, 1990

[54] REFLECTIVE MATRIX MIRROR VISIBLE TO INFRARED CONVERTER LIGHT VALVE

[75] Inventor: Paul O. Braatz, Canoga Park, Calif.

[73] Assignee: Hughes Aircraft Company, Los Angeles, Calif.

[*] Notice: The portion of the term of this patent subsequent to Jun. 27, 2006 has been disclaimed.

[21] Appl. No.: 463,904

[22] Filed: Jan. 10, 1990

Related U.S. Application Data

[63] Continuation of Ser. No. 759,004, Jul. 25, 1985, abandoned.

[51] Int. Cl.$^5$ .................... G02F 1/135; H01L 27/14
[52] U.S. Cl. .................... 350/338; 250/331; 350/342; 350/354
[58] Field of Search .................. 250/213 R, 330, 331; 350/338, 342, 354, 355, 356; 357/19; 427/88

[56] References Cited

U.S. PATENT DOCUMENTS

| | | |
|---|---|---|
| 3,592,527 | 7/1971 | Conners et al. . |
| 3,694,053 | 9/1972 | Kahn . |
| 3,824,002 | 7/1974 | Beard . |
| 3,968,272 | 7/1976 | Anand .................. 427/88 |
| 4,018,509 | 4/1977 | Boswell . |
| 4,019,807 | 4/1977 | Boswell . |
| 4,032,954 | 6/1977 | Grinberg et al. ............... 350/342 |
| 4,114,991 | 9/1978 | Bleha . |
| 4,228,449 | 10/1980 | Braatz .................... 357/19 |
| 4,239,348 | 12/1980 | Grinberg et al. . |
| 4,378,955 | 4/1983 | Bleha et al. . |
| 4,443,064 | 4/1984 | Grinberg et al. . |
| 4,586,069 | 4/1986 | Koniger et al. .............. 357/30 |

FOREIGN PATENT DOCUMENTS

| | | |
|---|---|---|
| 10084930 | 8/1983 | European Pat. Off. . |
| 1955915 | 6/1970 | Fed. Rep. of Germany . |
| 2227547 | 11/1974 | France .................. 350/342 |

OTHER PUBLICATIONS

F. J. Kahn, "Electric-Field Induced Orientational Deformation of Nematic Liquid Crystals Tunable Birefringence", *Applied Physics Letters*, vol. 20, pp. 199–201.

U. Efron et al, "The Liquid Crystal-Based Visible to IR Dynamic Image Converter (VIDIC)", SPIE Proc., Jan. 1984, vol. 465, pp. 181–191.

Jan Grinberg et al, "A New Real-Time Non-Coherent to Coherent Light Image Converter the Hybrid Field Effect Liquid Crystal Light Valve", Optical Engineering, vol. 14, No. 3, May–Jun. 1975, pp. 217–225.

U. Efron et al, "A Silicon Photoconductor-Based Liquid-Crystal Light Valve", SID 81 Digest, p. 142, 1981.

P. J. Melz, "Photoconductor/Electrochromic Element for Laser-Beam-Addressable Display", IBM Technical Disclosure Bulletin, V. 19, No. 9, Feb. 1977, New York, pp. 3580–3581.

Patent Abstracts of Japan, vol. 7, No. 113, May 18, 1983 and JP, A, 5834435 (28 Feb. 1983).

U. Efron et al, "Liquid Crystal-Based Visible-to-Infrared Dynamic Image Converter", Opt. Engineering, vol. 24, No. 1, Jan./1985, pp. 111–118.

*Primary Examiner*—Bruce Y. Arnold
*Assistant Examiner*—Martin Lerner
*Attorney, Agent, or Firm*—V. D. Duraiswamy; P. M. Coble; W. K. Denson-Low

[57] ABSTRACT

A reflective matrix mirror visible to infrared converter light valve (5) includes a liquid crystal medium (60) for spatially modulating an incident infrared beam by polarization rotation, a photosubstrate (30) for receiving an incident visible wavelength image (115) and for controlling the polarization rotation of the liquid crystal medium (60) responsively to the visible image (115), and a reflective matrix mirror (40). The reflective matrix mirror (40) is positioned between the liquid crystal medium (60) and the photosubstrate (30) and reflects the incident infrared beam (125) back through the liquid crystal medium (60) such that the infrared beam (125) passes through the liquid crystal medium twice and is polarization rotated responsively to the visible wavelength image (115). A polarizer (90) positioned exteriorly of the liquid crystal medium (60) converts the polarization rotation of the infrared beam (125) into output intensity modulation to produce an infrared image (130). The reflective matrix mirror (40) comprises an M×N array of infrared reflective islands comprising metallic or semiconductor/metallic compounds. The reflective matrix mirror (40) can be formed by depositing reflective material on a layer of silicon dioxide in a grid pattern using a masking technique. Alternatively, the silicon dioxide may be etched to provide an M×N array of depressions which are then used as deposition sites for the reflective material. In this later embodiment, the reflective material may be in contact with photosubstrate (30) so as to form Schottky Barrier contacts.

13 Claims, 3 Drawing Sheets

REFLECTIVE MATRIX MIRROR VISIBLE TO INFRARED CONVERTER LIGHT VALVE

This is a continuation of application Ser. No. 759004, filed July 25, 1985, now abandoned.

BACKGROUND OF THE INVENTION

The present invention relates generally to light valves and more particularly to the use of a reflective matrix mirror in liquid crystal light valves. The invention further relates to using liquid crystal light valves for converting visible wavelength images to infrared wavelength images.

In the development of infrared imagers or "seekers" for advanced search and tracking systems, it is important to be able to test the infrared imagers with the same complex, dynamic scenes as they will encounter under actual field conditions. It is also important to be able to do so non-destructively to minimize cost and time factors.

Therefore, computerized simulation systems are used for non-destructive infrared imager testing. Various field tests can thus be simulated and projected to the infrared imager for performing parametric testing in the laboratory. The advantages of such simulation systems are that they facilitate mission variation, accurately reproduce test environments, and increase proficiency in implementing improvements.

Computerized simulation systems generate an infrared coded visible wavelength image on a cathode ray tube (CRT) and convert it to a high-power infrared image which is projected onto an infrared imager under test. Both the CRT and the infrared imager are coupled to a computer which generates the visible images and monitors infrared images "seen" by the infrared imager. The heart of the simulator is an image converter which takes the infrared coded visible images on the CRT and converts them to the infrared images sensed by the infrared imager.

Ideally, a simulation system should be capable of providing a complex, fast-changing infrared scene with a high degree of dynamic range and resolution, and likewise be capable of real-time interaction with the computerized image generation system. Existing simulation systems have difficulty in meeting these criteria, primarily because of the prior IR conversion devices which have been used.

These prior devices typically utilize thermally produced radiation from thin-film materials for image conversion. Operation of such devices consists of illuminating the film with a high intensity visible beam containing scenery information from a CRT (or movie projector). The film heats up locally in response to the image intensity of the input visible beam and then emits an infrared wavelength pattern that is related to the spatial information presented by the high intensity visible input beam. With such devices, thermal images are projected directly onto the infrared imagers, and the input visible source is directly coupled to the output infrared image, both of which are disadvantageous.

In addition, the thin film infrared simulation systems suffer from low resolution caused by thermal spread in the image plane; slow thermal response caused by large thermal time constants; and limited dynamic range due to the conflict between higher resolution and the dynamic range of a thermal based simulation system.

Liquid crystal-based "light valves" or spatial light modulators have been proposed for use as infrared image converters due to their ability to modulate an infrared beam by polarization-rotation. An example of such a device is set forth in U.S. Pat. No. 4,114,991, to W. T. Bleha on Sept. 19, 1978. The development of, and theory underlying, light valve technology is illustrated in such patents as U.S. Pat. No. 3,824,002, issued to T. D. Beard on July 16, 1974 and U.S. Pat. No. 4,019,807, issued to D. D. Boswell, et al. on April 26, 19777. The basic design of alternating-current (AC) light valves is shown in the Beard patent. The configuration and operation of the light valve in the hybrid field effect mode, which accomplished the polarization-rotation necessary to effect spatial modulation of an infrared beam is discussed in the Boswell Patent, as well as in U.S. Pat. No. 4,378,955, issued to W. T. Bleha on Apr. 5, 1983. All of these patents are owned by the assignee of the present invention.

Several problems exist with employing existing light valves in the infrared wavelength spectral region which relate to the electro-optical properties of the materials used.

Existing reflection-mode light valves used for visible to infrared conversion, such as that shown in U.S. Pat. No. 4,114,991 pass an infrared beam through a relatively thick silicon photosubstrate. This results in distortion introduced by multiple reflections at the silicon/liquid crystal interface and by internal scattering from crystalline defects and inhomogeneities.

Furthermore, in the prior art light valves, the design of a suitable dielectric mirror for use in the infrared spectral region, generally at 5–10 $\mu$m, is often difficult. In order to provide sufficient reflection for long wavelength infrared radiation, the dielectric mirrors are often relatively thick multi-layer structures. This creates mirrors having large electrical impedances with respect to the liquid crystal layers employed. Since the optical conversion efficiency is proportional to the ratio of the mirror impedance to the liquid crystal impedances, it is therefore undesirable to have a very large mirror impedance.

Prior art light valves are also primarily AC devices. It would be beneficial to eliminate the AC requirement for the light valves and operate them in a DC configuration.

Lastly, in a missile testing environment, it is desirable to provide for ever-increasing speed and contrast capabilities as the speed and performance of the missiles increase. The dielectric mirrors in the prior art, because of the limitations in their design, are often not suitable for extremely high-speed imaging.

Accordingly, it is the principal purpose of the present invention to provide a high-speed, high-contrast liquid crystal light valve to perform visible to infrared image conversion.

Another purpose of the present invention is to eliminate distortion at the interface between the silicon substrate and the liquid crystal.

A further purpose of the present invention is to provide a liquid crystal light valve capable of operating in a AC or DC configuration.

Yet another purpose of the present invention is to operate a mirror in a liquid crystal light valve in the infrared region and to achieve both high infrared reflectivity and low series resistance.

SUMMARY OF THE INVENTION

The present invention, in a broad aspect, is a visible to infrared converter light valve using a reflective matrix mirror. The light valve includes a liquid crystal medium for spatially modulating an incident infrared beam by polarization rotation, a photoconductor for receiving an incident visible wavelength image and for controlling the polarization rotation of the liquid crystal responsively to the visible image, and a reflective matrix mirror. The reflective matrix mirror is positioned between the liquid crystal and the photoconductor and reflects the incident infrared beam back through the liquid crystal such that the infrared beam passes through the liquid crystal twice and is polarization rotated responsively to the visible wavelength image. The mirror includes a plurality of infrared reflective islands. A polarizer positioned exteriorly of the liquid crystal converts the polarization rotation of the infrared beam into an output intensity modulation to produce an infrared image.

In accordance with one feature of the invention, the reflective matrix mirror comprises an array of spaced apart reflective elements deposited on a silicon substrate.

In accordance with a second feature of the invention, the reflective matrix mirror is formed on a layer of silicon dioxide which is etched to form a grid pattern. A conductive infrared reflective material such as aluminum or gold is then evaporated into the etched depressions to form the reflective matrix.

In accordance with another feature of the invention, the reflective matrix mirror allows a light valve visible to infrared converter to be utilized in an AC or a DC configuration because the mirror is in intimate electrical contact with the underlying photosensitive silicon substrate.

The reflective matrix mirror light valve of the present invention utilizes a liquid crystal layer in a reflective mode of operation. In this manner, the infrared readout beam which is to be locally phase modulated, traverses the liquid crystal layer twice and results in twice as much infrared polarization rotation per unit liquid crystal length per unit signal than would be possible in a non-reflection mode light valve structure. This doubling of the optical path length, therefore, allows the use of, for a given contrast ratio, one-half of the liquid crystal thickness and thereby increases the liquid crystal transient response by a factor of 4, as this quantity is inversely proportional to the square of the liquid crystal thickness.

Yet another advantage of the present invention is the elimination of multiple reflection interferences at the interface of the silicon photosubstrate and the liquid crystal as found in the prior art. The need for a dichroic beam splitter is also eliminated by the reflective matrix mirror.

Other objects, features and advantages of the present invention will become apparent from a consideration of the following detailed description and the accompanying drawings.

DESCRIPTION OF THE PREFERRED EMBODIMENTS

Figure 1:
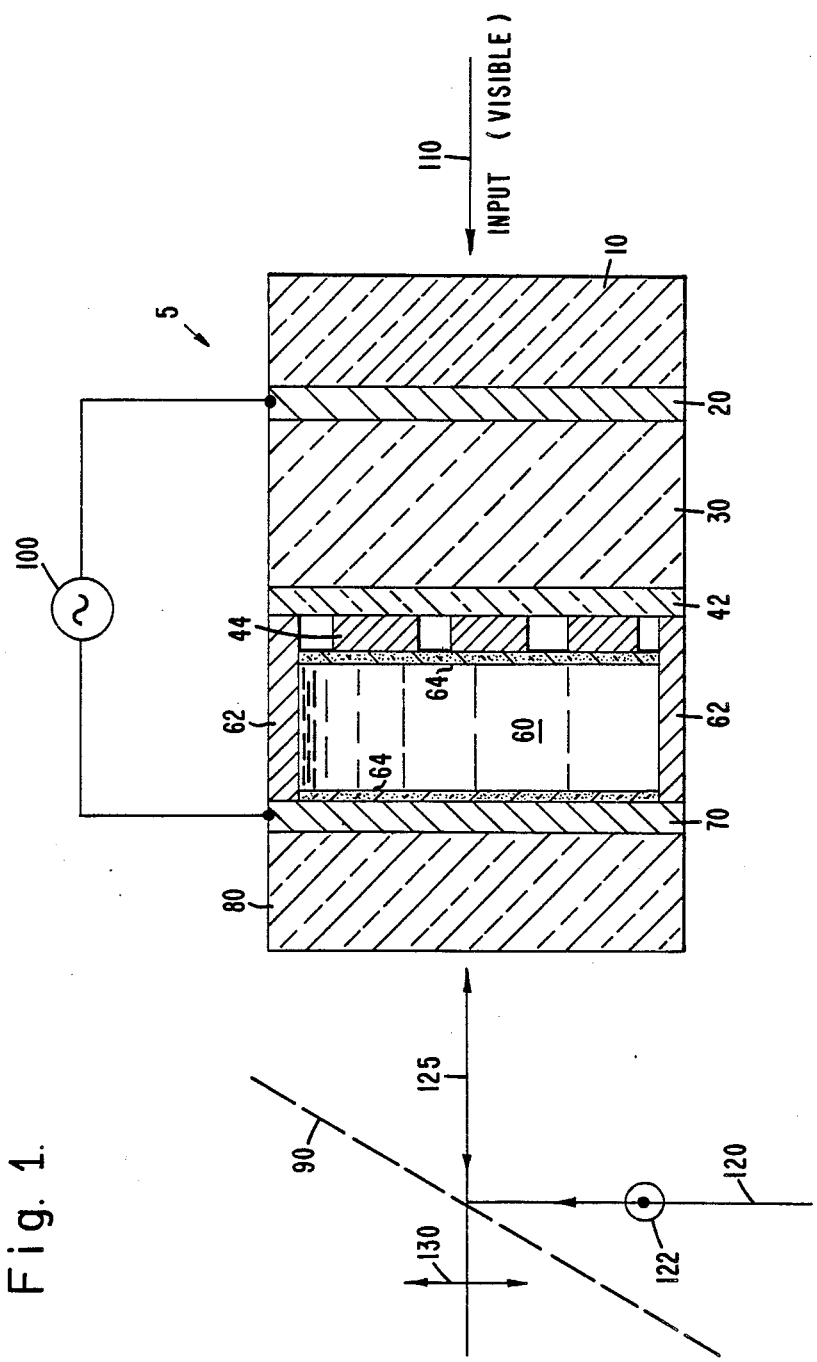
FIG. 1 is a sectional view of a metal matrix mirror visible-to-infrared converter light valve according to the present invention.

Referring more particularly to the drawings, FIG. 1 shows a sectional view of a metal matrix mirror visible to infrared converter light valve 5 according to the present invention. Light valve 5 converts a dynamic visible wavelength beam 110 to a dynamic infrared image or beam 130 through the modulation of an incident infrared readout beam 120.

Liquid crystal light valve 5 is configured in a manner similar to light valves previously used in the art including the light valve disclosed in the Beard patent discussed above. Light valve 5 comprises a liquid crystal medium 60 positioned between an infrared reflector or mirror 40 (comprising reflective islands 44 on a substrate 42), photosubstrate 30, electrode 20 and transparent faceplate 10 on one side and electrode 70 and infrared transparent faceplate 80 on the other.

In FIG. 1, a visible wavelength input image beam 110 (on the order of $\lambda < 1.2$ $\mu$m) enters light valve 5 through faceplate 10 and an infrared wavelength (on the order of (1.2 $\mu$m $< \lambda <$ 300 $\mu$m) readout image beam 120 enters light valve 5 through faceplate 80.

Visible input beam 110 is provided by an optical image source, not shown for clarity, such as a CRT display, video camera system or other image projectors. Beam 110 need not be a high power or very high intensity beam as in previous thermally-based imaging system. The beam is directed to light valve 5 by conventional optical elements, also not shown, commonly used in the art for this purpose.

Faceplate 10 is substantially transparent to visible wavelength radiation and provides mechanical support and integrity as well as electrical isolation of electrode 20. Faceplate 10 can comprise several materials known in the art including, but not limited to, an optical quality glass substrate or a fiber optic faceplate which is composed of an array of optical fiber waveguide segments highly transmissive of visible wavelength radiation.

Adjacent to faceplate 10 is electrode 20 which provides a low resistivity voltage path for one surface of photosubstrate 3 while being optically transparent to visible wavelength radiation. This can be achieved by using a thin film of indium-tin-oxide (ITO) on the order of 1 $\mu$m or less thick which is substantially transparent to visible radiation. Other exemplary electrodes would be aluminum or gold on the order of 300 $\mu$m to 500 $\mu$m thick.

At the same time, it is readily appreciated by one skilled in the art that for the embodiment of FIG. 1, electrode 20 and faceplate 10 can also be combined into a single element as where a conductive coating is deposited on a glass substrate.

Adjacent to electrode 20 is photosubstrate 30 which interacts with visible beam 110 so as to absorb a high percentage of beam 110 Photosubstrate 30 can comprise materials known in the art such as a metal oxide semiconductor photosubstrate or a cadmium sulfide photosubstrate as previously described in U.S. Pat. No. 4,239,348, issued to J. Grinberg, et al on Dec. 16, 1980 and/or U.S. Pat. No. 4,443,064, issued to J.Grinberg, et al on Apr. 17, 1984. The description of the photosubstrates in these patents are incorporated herein by reference. Alternatively, a Schottky barrier structure can be used as described in more detail below.

When the dynamic input image in the form of a visible input beam 10 is absorbed in photosubstrate 30, it effects a spatial modulation of the impedance of the photoconductor.

With a voltage applied across the liquid crystal medium 60 and photosubstrate 30 combination, a variation in photoconductor impedance creates a variation in voltage drop across liquid crystal medium 60 which in turn varies the crystal orientation and the polarization rotation induced in infrared radiation traversing liquid crystal medium 60. Therefore, spatial intensity variations in visible input beam 110, which is absorbed by photoconductor 30 effect spatial modulation in the polarization of infrared radiation traversing liquid crystal medium 60.

Continuing with FIG. 1, infrared radiation to be modulated by medium 60 is provided by an infrared readout or output beam 120. Beam 120 is provided by a reasonably high quality infrared source, not showing, such as is known in the art. It may be desirable to filter beam 120 to assure that no visible radiation ($\lambda < 1.2$ $\mu$m) is present which could interact with photosubstrate 30. This can be accomplished by the material forming faceplate 80 The beam is directed onto faceplate 80 through the use of an infrared wavelength wire grid beam splitter polarizer 90.

Wire grid polarizer 90 reflects radiation an intensity dependent upon its angle of polarization with respect to the grid members. The maximum reflectivity for radiation incident on polarizer 90 is for radiation polarized parallel to the grid members. Therefore, in the preferred embodiment of the present invention the infrared beam 120 source is arranged so as to produce an infrared beam that is substantially 100 percent polarized parallel to the grid members or maximum transfer efficiency. This is illustrated in FIG. 1 by the indication at point 122 that beam 120 is polarized perpendicular to the plane of the figure.

The resultant infrared beam 125 passes through faceplate 80 then through the transparent electrode 70 and liquid crystal medium 60 before encountering mirror 40 where it is reflected back through medium 60, electrode 70 and faceplate 80.

The double pass of infrared beam 125 increases the overall control over polarization rotation by each resolution element in medium 60 and increases the contrast. Exiting faceplate 80 infrared beam 125 encounters wire grid polarizer 90 where polarization rotation is converted into intensity modulation. Radiation in infrared beam 125 has b polarization rotated spatially by various angles due to passage through liquid crystal medium 60 so that one component of the polarized radiation passes through grid 90 while the other polarization component is reflected. The transmitted infrared polarization component now represents the spatial intensity of visible input beam 110.

Faceplate 80 provides an optical interface for the liquid crystal medium as well as mechanical support and electrical isolation. Faceplate 80 can comprise several infrared and near-infrared transmitting materials known in the art including, but not limited to, a 6 to 10 mm potassium chloride (KCI) substrate, a single crystal germanium sub or an optical quality sapphire substrate. In faceplate 80 can be a fiber optic faceplate which composed of an array of optical fiber waveguide segments that are highly transmissive of infrared wavelength radiation.

Electrode 70 provides a low resistivity voltage path for one surface of liquid crystal medium 60 while being optically transparent to infrared wavelength radiation. This can be achieved by using a very thin film of indium-tin-oxide (ITO) on the order 0.02 $\mu$m or less thick which is substantially transparent to infrared radiation. The ITO film of electrode 70 can be deposited onto the face of faceplate 80. It is readily understood by those skilled in the art that other metals or materials such as $In_2O_3$ can be used provided are thin enough and have a low enough free electron carrier density to allow the infrared radiation to pass through without unreasonably high absorption.

Liquid crystal medium 60 comprises liquid crystal media known in the art such as described in U. Pat. No. 3,694,053 issued to F. J. Kahn or in "The Liquid Crystal-Based Visible to IR Dynamic Image Converter (VIDIC)," U. Efron et al, *SPIE Proceedings*, Paper 456-22, Jan. 22-27, 1984. The specific material chosen is dependent upon parameters known in the art such as the operating wavelength, mode of operation and required response or recovery time.

In the preferred embodiment, liquid crystal medium 60 is surrounded on the periphery by a space which chemically and electrically isolates the medium from surrounding apparatus and environment. The is spacer is material such as $S_iO_x$ where x is in the rang 1 to 2, deposited 4–12 $\mu$m thick. THe spacer helps establish a desired thickness for the medium which may otherwise be compressed by adjacent materials or flow and away and the dimensions are determined accordingly. Additionally, intermediate layers 64 can be positioned adjacent to medium 60. These layers comprise material such as $SiO_x$ which are used in the art for purposes of liquid crystal alignment or isolation.

The liquid crystal medium can be operated in one of several modes including the controlled birefringence mode as described in "Electric-Field-Induced Orientational Deformation of Nematic Liquid Crystals: Tunable Birefringence," by F. J. Kahn, *Applied Physics Letters*, Vol. 20, pages 199–201 or the hybrid field effect mode as disclosed in U.S. Pat. No. 4,378,955 and 4,019,807 discussed above. Other modes such as the dynamic scattering mode, while less useful could be employed with the present invention. However, for some operating modes the response time of the light valve is reduced and the operating lifetime diminishes. Therefore, the preferred embodiment utilizes the hybrid field effect mode.

In order to fully utilize the polarization rotation abilities of liquid crystal medium 60 and achieve maximum conversion efficiency, a highly reflective infrared mirror 40 is needed. Infrared radiation penetrating into the photosubstrate amounts to a loss of output radiation and an increase in the signal to noise ratio. At the same time, mirror 40 must possess a sufficiently high electrical impedance between adjacent resolution elements in order to not create an electrical short at the mirror and liquid crystal interface.

Liquid crystal medium 60 is activated by voltage changes over dimensionally small areas which approximate individual resolution elements. As long as the individual areas behave in a reasonably autonomous fashion, the overall light valve essentially comprises an array of resolution elements or pixels for processing input radiation. If the mirror electrically shorts these elements together, then the effective number of picture elements decreases and the amount of spatial resolution achievable with this device is lowered. Therefore, the mirror impedance is an important parameter. However, in the past, a highly reflective element would comprise a continuous multilayer dielectric mirror which would, in fact, degrade the resolution as well as, affect the overall liquid crystal modulation available.

The present invention uses a new apparatus without resorting to the dielectric mirrors with their drawbacks as previously discussed. Mirror 40 comprises a new key element for use in the manufacture of many types of liquid crystal light valves. Not only are basic operational parameters improved but new electrode configurations, to be discussed, are now possible using the new design for mirror 40.

Figure 2:
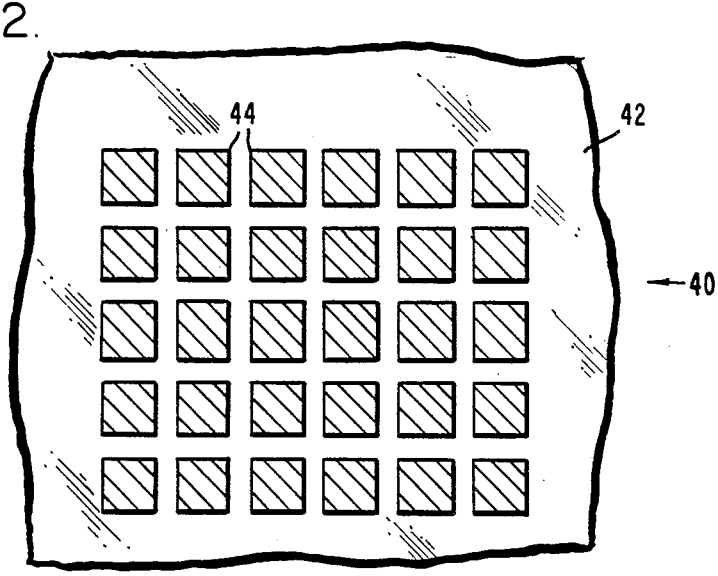
FIG. 2 is a sectional view of a reflective matrix mirror according to the present invention during the steps used in manufacture.

As shown in FIG. 2., mirror 40 is made in the form of an M by N matrix of individual reflective elements 44 which serve to reflect infrared radiation but are electrically isolated from each other. The exact number of elements and therefore the integer values of N and M depend on the overall size constraints for light valve 5 and the resolution capabilities of the particular liquid crystal medium chosen.

The minimum dimensions of the width w and height h for an individual element 44 are based on the wavelength of radiation to be reflected, minimum size resolution element and other factors discussed below. These dimensions (w, h) plus an appropriate separation distance d between adjacent islands 44 are divided into the width W and height H dimensions for the light valve face. The quotients of these divisions (W/w+d, H/h+d) are rounded to the lowest integral value and represent the number of islands (M, N) that can fit across the width (M) and height (N) dimensions of the light valve face. Therefore, this determines the size of the M by N array of islands 44 that is manufactured on substrate 42. If larger islands 44 are used in a specific application not requiring use of the minimum size resolution element then the numbers M and N decrease accordingly.

The reflective array of mirror 40 appears as a continuous reflective surface for infrared radiation (approximately 1.2 $\mu m < \lambda < 300$ $\mu m$) while maintaining a reasonably high electrical isolation between resolution elements for the proper or improved operation of liquid crystal medium 60 with respect to electrode 20. The reflective matrix mirror provides the appropriate conductivity perpendicular to the substrate plane and an appropriately high sheet resistance parallel to the substrate plane.

FIGS. 3, 4, and 5 illustrate three basic embodiments for the reflective elements comprising mirror 40. Each of these embodiments is manufactured using techniques known in the semiconductor and solid state arts and are discussed in more detail below.

Turning first to FIG. 3, an embodiment is illustrated in which a matrix of infrared reflective islands 44 are positioned on an insulating substrate 42 which is assembled into light valve 5. This embodiment can be manufactured by separately manufacturing substrate 42 or depositing a semi-insulating material, on photosubstrate 30. The semi-insulating material can be any material known to be useful for electrically insulating the photosubstrate, such as, but not limited to, silicon dioxide, or silicon nitride. Silicon dioxide is a preferred material because it is a convenient and readily manufactured substrate material.

Figure 3A:
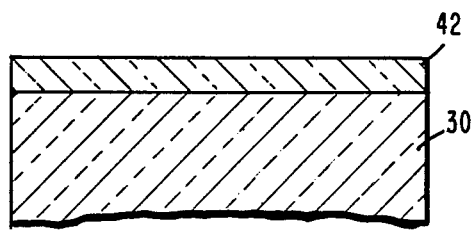
FIG. 3($a$) to ($c$) is a sectional view of a second embodiment for a reflective matrix mirror according to the invention during steps used in manufacture.

After substrate 42 is deposited as a thin uniform layer on photosubstrate 30, as shown in FIG. 3a, infrared reflective material 48 is deposited using a masking technique. The masking technique can be one of several methods known in the art for deposition of materials in a predetermined pattern, such as photo-lithography or ion beam lithography.

Figure 3B:
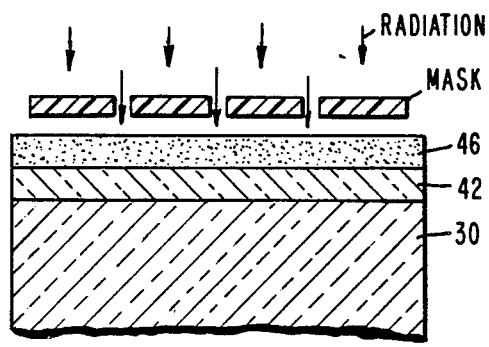
Figure 3C:
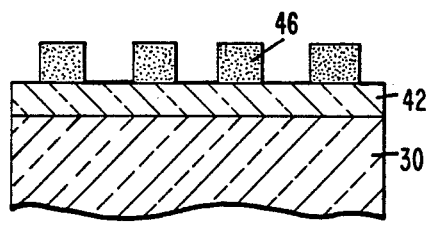

Typically, a layer of resist 46 is deposited on the substrate, as shown in FIG. 3b, and then exposed to radiation, to which it is sensitive, through a mask. For "negative" resists, the mask is patterned to coincide with the desired locations of material to be deposited later and for "positive" resists the mask is the negative. As illustrated in FIG. 3b, the radiation, light for photolithography, X-rays for X-ray-lithography, etc., exposes resist 46 and alters its structure. The resist is then processed by chemical developers which break down exposed negative resists or unexposed resists and removes them. The result is illustrated in FIG. 3c where substrate 42 is covered by resist 46 everywhere except where reflective material 48 is to be deposited.

Figure 3D:
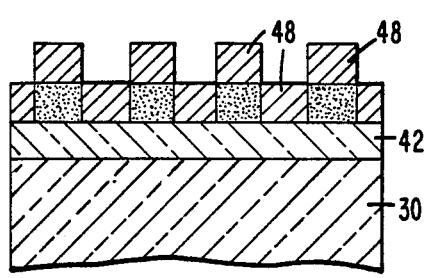
Figure 3E:
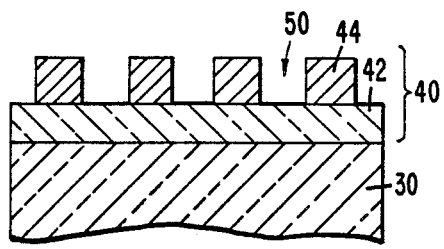

As shown in FIG. 3d, commercially available deposition techniques can then be used to deposit a layer of infrared reflective material 48 on substrate 42 as well as on top of remaining resist 46. The resist is then chemically removed, taking the undesired excess reflective material 48 and leaving the array of isolated reflective islands 44, as illustrated in FIG. 3e and FIG. 2.

Depending on the resolution of the specific masking technique used, the reflective deposits 44 are nearly square in shape and are separated by a grid of square channels 50.

The masks used for this technique are designed to establish channels that are on the order of 0.1 $\mu m$ to 2 $\mu m$ across in order to provide adequate resistance for the mirror. This separation is also much less than the wavelength of the expected incident radiation so that the radiation sees the reflective array as an optically continuous mirror. The separation can be smaller than 0.1 $\mu m$ and maintain adequate electrical impedance depending upon the materials used, but current manufacturing techniques dictate this as a reasonable limit at this time.

The separation of the reflective islands 44 can be larger than 2 $\mu m$ provided the distance is always much less than the wavelength of radiation to be reflected. Accordingly, for wavelengths on the order of 220 $\mu m$ to 300 $\mu m$, the separation could be on the order of 20 $\mu m$ to 60 $\mu m$.

The dimensions of the individual islands 44 of reflective material 48 are determined from a minimum size for adequate reflection, on the order of 5 $\mu m$ to 10 $\mu m$ and the size of resolution or pixel element that is designed into the light valve structure. The overall dimensions of liquid crystal medium 60 are considered and divided into the number of pixels ($10^3$, $10^4$, $10^5$ . . .) in order to determine the island 44 dimensions. At the same time, it is known in the art that many light valve structures have limited numbers of resolution elements and the usefulness of the present invention will depend upon the design and materials chosen for a specific application. However, the same overall dimension, wavelength and pixel element number analysis applies for any light valve in order to compute the size for reflective islands 44.

The thickness of reflective islands 44 must also be considered in the manufacturing of mirror 40. The thickness depends on the specific reflective material 48 used. It is well known in the art that different materials have differing reflectivities for infrared radiation and that they require differing thicknesses to reflect the same percentage of infrared radiation. There is a basic requirement that the free electron density of the material be sufficient to interact with the infrared radiation and scatter it back out of the material.

For a reflective element 44 comprising metals such as, but not limited to, gold or aluminum, a thickness the order of greater than 0.05 $\mu$m is sufficient although more than 0.1 $\mu$m is preferred. At the same time, a reflective island 44 comprising metal/semiconductor compounds such as, but not limited to, platinum-silicide, silicide, may require 0.1 $\mu$m to 0.2 $\mu$m in order to have sufficient electron densities.

There is no maximum thickness for reflective material 48 in terms of its infrared reflectivity. However, design considerations in terms of the overall mirror and light valve 5 dimensions become determinative. Also, there is obviously no need to waste additional material and processing time once the point of reflection is reached.

While the manufacturing technique illustrated in FIG. 3 is well understood, it may be limited as to the resolution achievable in terms of the separation distance between the reflective islands 44. Current masking techniques, especially photo-lithography are not well suited to resolutions on the order of 1 $\mu$m or less. It is also difficult to impose such small resolution on a process that depends on lifting off the excess to define channel 50 limits.

Figure 4B:
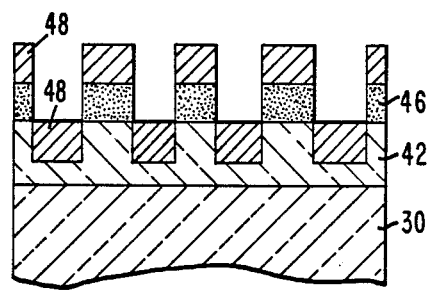
FIG. 4($a$) to ($c$) is a sectional, view of a third embodiment for a reflective matrix mirror according to the invention during steps used in manufacture.
Figure 4C:
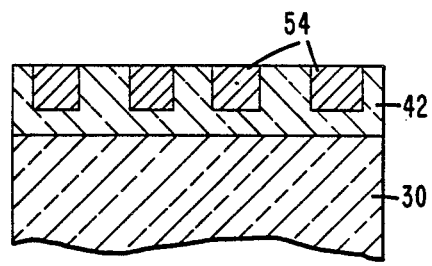
Figure 4A:
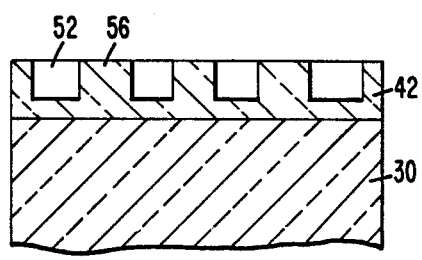

An alternative embodiment is illustrated in FIG. 4. As shown in FIG. 4a, the silicon substrate 42 is etched in order to provide an array of depressions 52 in the silicon bordered by separating walls or barriers 56. The depressions can be made by using a resist 46 as in the previous embodiment and using a reactive plasma etch or chemical etch before deposition of reflective material 48. The etching creates a more precise depression which defines the dimensions. Alternatively, an electronically controlled ion beam etching process can be used to precisely position and define depressions 52. Once the depressions are formed, they are filled with reflective material 48, such as by evaporation, creating the element illustrated in FIG. 4b. Again the remaining resist 46 is removed, taking excess material 48 with it, resulting in the matrix mirror illustrated in FIG. 4c.

In this technique, the depressions define the dimensional limits of reflective islands 54 and the last resist lift off step does not degrade this dimension with excess metal as only the deposited metal in the depressions remains.

The depth of the depressions is directly dependent upon the thickness of reflective material that is to be deposited. First, there is no gain in making depressions deeper than required for the materials as this is wasteful manufacturing. Second, a smooth reflective surface for the radiation is desired. Any edges or walls 56 projecting above the reflective islands 54 could create surfaces for reflection or refraction because of index changes. This could deleteriously affect mirror 40 operation. So, the depressions are manufactured to the depth the reflective material 48 will have.

The above technique can be used to manufacture mirror 40 and create depressions 54 deeper than desired but finish the process with a polishing step, either mechanical or chemical that removes any raised substrate material or even polishes the whole surface down to a desired thickness. However, the preferred embodiment of the present invention would be to make the depressions only as deep as necessary on the initial steps.

Using the above techniques, several types of photosubstrates can be utilized in the light valve. Photosubstrate 30 can be, as discussed above, a MOS AC type of structure as employed in the prior art patents, where the electrically isolated metal matrix elements of the mirror would reside on a silicon dioxide gate structure and effectively replace the dielectric mirror of that device (e.g., element 12 in U.S. Pat. No. 4,114,991). Alternately, in a DC device configuration, the metal matrix islands defining each pixel-element would either form direct ohmic contacts to an isolated array of PN junction diodes or serve as the individual metallic plates of an array of Schottky barrier diodes.

In order to achieve a Schottky Barrier configuration for photosubstrate 30, a third embodiment for mirror 30 is required. FIG. 5 illustrates a modification to the embodiment of FIG. 4 in which two reflective materials 48 and 58 comprise reflective islands 54.

Figure 5A:
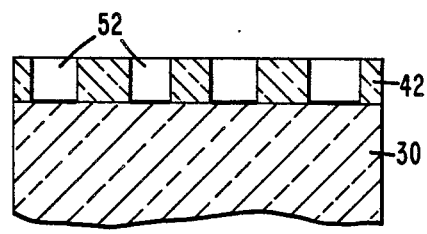
FIG. 5($a$) and ($b$) is a sectional view of a fourth embodiment of a reflective matrix mirror according to the invention during steps of manufacture.

Depressions 52, as shown in FIG. 5a, are manufactured as previously described except that they are etched to penetrate completely through substrate 42. This allows the formation of contacts directly on photosubstrate 30. A particular metallic or semi-metallic compound preferred for reflective material 48 may not provide the best Schottky Barrier element. Therefore, a layer of material 58 is deposited in the depressions for purposes of forming a good Schottky Barrier interface. For this application, materials such as platinum would be deposited in a very thin layer so as to provide a good Schottky contact with the material forming photosubstrate 30. Then, a reflective material 48 such as gold or aluminum can be deposited on top of the platinum in order to provide the reflective island 54 structure as before.

Figure 5B:
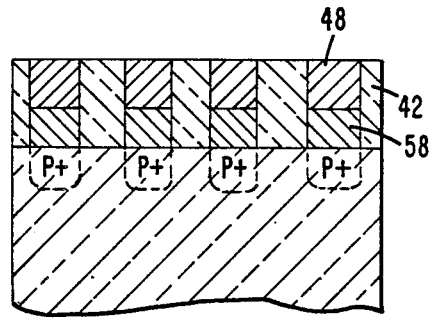

In addition, photosubstrate 30 can comprise material such as silicon that is p+-doped in order to implement a true PN junction. This is illustrated in FIG. 5b by P+ regions position under the material 58.

This latter embodiment can be driven by a DC voltage source which has several known advantages such as a decrease in regulation restraints and elimination of pulse timing. The conventional operation of light valve 5 as illustrated in FIG. 1 requires the use of a conventional AC voltage source 100 of the type discussed in the basic light valve patents previously cited. Voltage source 100 is operatively connected to electrodes 20 and 70 and provides an asymmetric waveform such that photosubstrate 30 alternates between a long (active) depletion phase and a short (refreshing) accumulation phase. This timing and waveform generation is reasonably understood in the art but adds complexity to the light valve operation. The embodiment of FIG. 5 allows an improvement over the prior art arrangement.

The structures described above for preferred embodiments of the present invention are clearly not all inclusive of the possible substrates and material layers that can be employed in the manufacture of liquid crystal light valves. It is also to be understood that additional insulating layers of material such as silicon dioxide or additional faceplate structures can be used where increased isolation of the liquid crystals is desired or where additional mechanical strength is required.

What has been described is a new type of reflective matrix mirror and a visible to infrared converter utilizing same. The apparatus manufactured according to the principles of the present invention yield liquid crystal light valves having improved speed of response and contrast as well as new operating modes.

In the foregoing description of the present invention, preferred embodiments of the invention have been disclosed. It is to be understood that other design variations are within the scope of the invention. Accordingly, the invention is not limited to the particular arrangements which have been illustrated and described in detail herein.

What is claimed is:

1. A visible to infrared image converter light valve which is operable by alternating current comprising:
    (a) liquid crystal means for spatially modulating input infrared radiation by polarization rotation to produce a modulated infrared beam;
    (b) a photosensitive semiconductor substrate for receiving an incident visible wavelength image and for controlling said polarization rotation of said input infrared radiation responsively to said image;
    (c) insulating means in contact with said semiconductor substrate and positioned between said liquid crystal means and said semiconductor substrate, said insulating means including a continuous layer of material suitable for blocking DC current, said insulating means preventing direct contact between said liquid crystal means and said semiconductor substrate; and
    (d) reflective matrix mirror means, disposed on said insulating means between said liquid crystal means and said insulating means, for reflecting said modulated infrared beam back through said liquid crystal means, said reflective matrix mirror means including a plurality of isolated reflective islands.

2. The light valve of claim 1 wherein the material of said reflective islands comprises metal.

3. The light valve of claim 2 wherein said reflective islands are arranged as an array, the spacing between adjacent said reflective islands being related to the wavelength of said input infrared radiation so that said array acts as an optically continuous reflective surface for said input infrared radiation while maintaining electrical isolation between said reflective islands in a direction parallel to said semiconductor substrate.

4. The light valve of claim 3 wherein the spacing between said reflective islands is on the order of 0.1 $\mu$m to 10 $\mu$m.

5. A reflective matrix mirror for use in liquid crystal light valves operable in an A.C. reflective mode with incident radiation having wavelengths in the infrared wavelength ranges comprising:
    an array of infrared reflective elements positioned on a supporting insulating substrate and spaced apart by a distance smaller than the wavelength of incident radiation to be reflected, with each said element having dimensions on the order of the resolution element dimensions for the liquid crystal light valve used and thickness sufficient to provide desired reflectivity such that reflection of incident infrared radiation is achieved with improved spatial resolution;
    said insulating substrate comprising a continuous layer suitable for blocking DC current.

6. A reflective matrix mirror for use in alternating-current driven liquid crystal light valves operable in reflective mode, comprising an M×N array of infrared reflective elements positioned on a supporting substrate where M and N are integers and each element is spaced apart from adjacent elements by a distance smaller than the wavelength of incident radiation to be reflected, so that said array acts as an optically continuous reflective layer for the incident radiation, wherein said reflective elements are spaced apart on the order of 0.1 $\mu$m to 2 $\mu$m, with each element having dimensions on the order of the resolution element dimensions for the liquid crystal light valve used and comprising infrared reflective material having a thickness at least of a magnitude sufficient to provide reflectivity of incident radiation.

7. A reflective matrix mirror for use in alternating-current driven liquid crystal light valves operable in reflective mode, comprising an M×N array of infrared reflective elements positioned on a supporting substrate, where M and N are integers, and each reflective element is spaced apart from adjacent elements by a distance smaller than the wavelength of incident radiation to be reflected, so that said array acts as an optically continuous reflective layer for the incident radiation, and wherein each element comprises either metallic or metallic/semiconductor compounds, and has a thickness greater than 0.05 $\mu$m and comprising either gold or aluminum, and dimensions on the order of the resolution element dimensions for the liquid crystal light valve used and comprises infrared reflective material having a thickness at least of a magnitude sufficient to provide desired reflectivity of incident radiation.

8. A reflective matrix mirror for use in alternating-current driven liquid crystal light valves operable in reflective mode, comprising an M×N array of infrared reflective elements positioned on a supporting substrate, where M and N are integers, wherein said reflective elements comprise platinum-silicide on the order of 0.01 $\mu$m or greater in thickness and are spaced apart by a distance smaller than the wavelength of incident radiation to be reflected so that said array acts as an optically continuous reflective layer for the incident radiation, and comprise either metallic or metallic/semicondcutor compounds, with each element having dimensions on the order of the resolution element dimensions for the liquid crystal light valve used and comprising infrared reflective material having a thickness at least of a magnitude sufficient to provide desired reflectivity of incident radiation.

9. An alternating-current driven visible to infrared converter light valve comprising:
    liquid crystal means for spatially modulating an input infrared beam by polarization rotation to produce a modulated infrared beam;
    photoconductor means for receiving an incident visible wavelength image and for controlling said polarization rotation responsively to said image;
    reflective matrix mirror means, disposed between said liquid crystal means and said photoconductor means, for reflecting said modulated infrared beam back through said liquid crystal means, whereby said modulated infrared beam passes through said liquid crystal means twice and is polarization rotated in proportion to said visible wavelength image, said reflective matrix mirror means including an N by M array of electrically isolated reflective islands disposed on a substrate, where N and M are integer quantities and are determined by the size and shape of the desired light valve divided by the number of resolution elements available, and said islands are spaced apart by a small distance as compared to the wavelength of said infrared beam so as to appear as an optically continuous reflective layer to said infrared beam, wherein said reflective islands comprise a material reflective of infrared wavelengths and wherein the distance between said reflective islands is less than the wavelength of said infrared beam and wherein the spacing between said reflective islands is on the order of 0.5 μm to 2.5 μm, and polarization means, positioned exteriorly of and disposed adjacent said liquid crystal means, for converting said polarization rotation of said modulation infrared beam into intensity modulation to produce an infrared image.

10. An alternating current driven visible to infrared converter light valve comprising:

liquid crystal means for spatially modulating an input infrared beam by polarization rotation to produce a modulated infrared beam;

photoconductor means for receiving an incident visible wavelength image and for controlling said polarization rotation respectively to said image;

reflective matrix mirror means, disposed between said liquid crystal means and said photoconductor means, for reflecting the modulated infrared beam back through said liquid crystal means, whereby said modulated infrared beam passes through said liquid crystal means twice and is polarization rotated in proportion to said visible wavelength image, said reflective matrix mirror means including an N by M array of electrically isolated reflective islands disposed on a substrate, where N and M are integer quantities and are determined by the size and shape of the desired light valve divided by the number of resolution elements available and being spaced apart by a small distance as compared to the wavelength of said input infrared beam radiation so as to appear as an optically continuous reflective layer to said input infrared beam of radiation, wherein said reflective islands comprise a material reflective of infrared wavelengths of input infrared radiation, wherein said substrate comprises an isolated array of doped regions and said islands are positioned at each doped site so as to form Schottky Barrier diodes, and polarization means, positioned exteriorly of and disposed adjacent said liquid crystal means, for converting said polarization rotation of said modulation infrared beam into intensity modulation to produce an infrared image.

11. A visible to infrared converter light valve comprising:

liquid crystal means for spatially modulating an input infrared beam by polarization rotation to produce a modulated infrared beam;

photoconductor means for receiving an incident visible wavelength image and for controlling said polarization rotation responsively to said image;

reflective matrix mirror means, disposed between said liquid crystal means and said photoconductor means, for reflecting the modulated infrared beam back through said liquid crystal means, whereby said modulated infrared beam passes through said liquid crystal means twice and is polarization rotated in proportion to said visible wavelength image, said reflective matrix mirror means including an N by M array of electrically isolated reflective islands, where N and M are integer quantities, and are determined by the size and shape of the desired light valve divided by the number of resolution elements available and being spaced apart by a small distance as compared to the wavelength of said input infrared beam radiation so as to appear as a uniform reflective layer to an input infrared beam of radiation, wherein each reflective island corresponds to one pixel in said infrared image, and polarization means, positioned exteriorly of and disposed adjacent said liquid crystal means, for converting said polarization rotation of said modulated infrared beam into intensity modulation to produce an infrared image.

12. A visible to infrared converter light valve, comprising:

liquid crystal means for spatially modulating an input infrared beam by polarization rotation to produce a modulated infrared beam;

photoconductor means for receiving an incident visible wavelength image and for controlling said polarization rotation responsively to said image, wherein said photoconductor means comprises a metal oxide semiconductor substrate;

reflective matrix mirror means, disposed between said liquid crystal means and said photoconductor means, for reflecting said modulated infrared beam back through said liquid crystal means, whereby said modulated infrared beam passes through said liquid crystal means twice and is polarization rotated in proportion to said visible wavelength image, said reflective matrix mirror means including a plurality of isolated reflective islands spaced apart so as to provide an optically continuous reflective surface to infrared radiation; and polarization means, positioned exteriorly of and disposed adjacent said liquid crystal means, for converting said polarization rotation of said modulated infrared beam into intensity modulation to produce an infrared image.

13. A visible to infrared converter light valve comprising:

liquid crystal means for spatially modulating an input infrared beam by polarization rotation to produce a modulated infrared beam;

photoconductor means for receiving an incident visible wavelength image and for controlling said polarization rotation responsively to said image;

reflective matrix mirror means, disposed between said liquid crystal means and said photoconductor means, for reflecting the modulated infrared beam back through said liquid crystal means, whereby said modulated infrared beam passes through said liquid crystal means twice and is polarization rotated in proportion to said visible wavelength image, said reflective matrix mirror means including a plurality of isolated reflective islands spaced apart so as to provide an optically continuous reflective surface to infrared radiation, and polarization means, positioned exteriorly of sand disposed adjacent said liquid crystal means, for converting said polarization rotation of said modulated infrared beam into intensity modulation to produce an infrared image, wherein said light valve further comprises second faceplate means, disposed exteriorly of said liquid crystal means and transparent to infrared radiation, for receiving said input infrared beam, wherein said faceplate means comprises potassium chloride or germanium.

* * * * *

UNITED STATES PATENT AND TRADEMARK OFFICE
CERTIFICATE OF CORRECTION

PATENT NO. : 4,973,136
DATED : November 27, 1990
INVENTOR(S) : PAUL O. BRAATZ

It is certified that error appears in the above-identified patent and that said Letters Patent is hereby corrected as shown below:

Col. 14, line 57, delete "sand" and insert --and--.

Signed and Sealed this

Fifth Day of October, 1993

Attest:

BRUCE LEHMAN

*Attesting Officer*     Commissioner of Patents and Trademarks